US006236795B1

(12) United States Patent
Rodgers (10) Patent No.: US 6,236,795 B1
(45) Date of Patent: May 22, 2001

(54) HIGH-DENSITY FIBER OPTIC CABLE DISTRIBUTION FRAME

(76) Inventor: E. Walter Rodgers, 5650 W. Marconi, Glendale, AZ (US) 85306

(*) Notice: Subject to any disclaimer, the term of this patent is extended or adjusted under 35 U.S.C. 154(b) by 0 days.

(21) Appl. No.: 09/326,814

(22) Filed: Jun. 7, 1999

(51) Int. Cl.[7] .................................................. G02B 6/00
(52) U.S. Cl. ................................... 385/134; 385/135
(58) Field of Search .................................. 385/134, 135, 385/136, 137, 138, 139

(56) References Cited

U.S. PATENT DOCUMENTS

| B1 Re. 34,955 | 8/1996 | Anton et al. ............................ 385/53 |
| 4,995,688 | 2/1991 | Anton et al. ........................ 350/96.1 |
| 5,214,735 | * 5/1993 | Henneberger et al. .............. 385/136 |
| 5,363,465 | 11/1994 | Korkowski et al. ................. 385/135 |

OTHER PUBLICATIONS

Excerpt from AT&T Distributing Frame Systems Products Manual (DFSPM), Aug. 1989, including pp. 3–15 through 3–18 regarding "Slide Drawer Assembly Protector Frame for 309–Type Connectors".
Undated AT&T Bulk Protection Slide Drawer Assembly (SDA) data sheet, published prior to 1998. No month.
"Fiber Distribution Frame", *ADC Telecommunications*, Jul. 90.
"FL2000 System, Second Edition", *ADC Telecommunications*, Jan. 95.
"KGP Telecommunications, Communications Specialists" Faribault, Minnesota, 1995, Edition, Pull Drawer Assembly (PDA) Product Guide. No month.

* cited by examiner

*Primary Examiner*—Phan T. H. Palmer
(74) *Attorney, Agent, or Firm*—Cahill, Sutton & Thomas P.L.C.

(57) ABSTRACT

A fiber optic cable distribution frame assembly includes a support frame in which a number of drawers are slidingly supported for movement between stored and extended positions. Incoming and outgoing fiber optic cables are routed to each drawer. Each drawer supports rows of termination connector support brackets, each such bracket including two or more connector support columns. Each such support column has first and second sets of support arms extending therefrom in opposing directions. The support arms extend at an angle of between 25 degrees and 65 degrees relative to the plane in which the drawer slides. An adaptor is supported by each of the support arms. Each adaptor receives termination connectors from a selected pair of incoming and outgoing fiber optic cables for removably coupling the selected pair of fiber optic cables.

12 Claims, 6 Drawing Sheets

HIGH-DENSITY FIBER OPTIC CABLE DISTRIBUTION FRAME

BACKGROUND OF THE INVENTION

1. Field of the Invention

The present invention relates generally to the management of telecommunications cabling, and more specifically, to distribution frames used for fiber optic cables.

2. Description of the Relevant Art

Fiber optic cables have found increasing usage in the telecommunications industry as a result of their greater bandwidth and immunity from noise. As in the case of conventional copper electrical conductors, fiber optic cables used in the telecommunications industry are typically bundled together in large bundles. At various locations within a fiber optic cable system, including at the central office of the telecommunications system operator, in Controlled Environment Vaults (CEVs) out in the field, and at the premises of larger customers, it is often necessary to terminate and distribute a large number of incoming and outgoing fiber optic cables. Typically, the bundles of fiber optic cables include a relatively large number of individual optical fibers. The task of keeping such large number of optical fibers organized at such termination/distribution points, so that the optical fibers can be properly distributed throughout the system, poses a significant challenge.

The space available at such termination/distribution points is often at a premium, so it is important to maintain a relatively high density of optical fiber connections at such locations to minimize the space required. On the other hand, optical fibers can not be bent along sharp bends without risk of damaging such fibers, so any system for connecting together the ends of such incoming and outgoing fibers must support the optical fibers in such a way as to avoid such sharp bends. Moreover, high density must not come at the cost of making it more difficult to properly identify particular incoming and outgoing fibers; otherwise, the system operator will not be able to efficiently maintain, modify, and diagnose the fiber optic system.

U.S. Pat. No. 4,995,688 to Anton, et al. discloses an optical fiber distribution frame for terminating and distributing fiber optic cables. The disclosed frame includes a series of modular cabinets, including a connector cabinet having an essentially planar front panel with sleeve adaptors for mounting a plurality of connector sleeves thereto at an angle to the front panel.

U.S. Pat. No. 5,363,465 to Korkowski, et al. discloses a fiber optic connector module that includes a framework for receiving circuit card cartridges, and each of the cartridges include electrical connectors for attachment to telecommunication wires and cables. The connectors are angled so that the bending radius of the cables is not too sharp as to cause damage to the cable.

However, the apparatus disclosed by the two above-mentioned patents fails to achieve the packing density, ease of identification, and convenience obtained by the invention that is the subject of the present application.

Accordingly, it is an object of the present invention to provide a fiber optic cable distribution frame which facilitates the connection of pairs of incoming and outgoing optic fibers as a highly dense, space-saving structure without concern for bending the optical fibers around too sharp a bend.

Another object of the present invention is to provide such a distribution frame which conveniently organizes a relatively large number of optical fibers at a termination/distribution points, and which allows such optical fibers to be easily identified so that they can be properly distributed throughout the fiber optic cable system.

Still another object of the present invention is to provide such a distribution frame as a highly dense structure, but which provides ready and convenient access to each coupled connection between incoming and outgoing optical fibers in order to efficiently maintain, modify, and diagnose the fiber optic system.

These and other objects of the present invention will become more apparent to those skilled in the art as the description of the present invention proceeds.

SUMMARY OF THE INVENTION

Briefly described, and in accordance with a preferred embodiment thereof, the present invention relates to a fiber optic cable distribution frame assembly for interconnecting fiber optic cables, and including a support frame for supporting at least one, and preferably a number of slide-out drawers for movement between a stored position inside the support frame and an extended position projecting from the support frame. In the preferred embodiment, the drawers are arranged vertically, and each drawer slides within a movement plane that extends parallel to the corresponding movement planes of the other drawers. Preferably, the support frame includes a slide track for slidably mounting each drawer thereto.

Each drawer includes at least one, and preferably several, termination connector support brackets that are used to support fiber optic cable connectors in a highly-dense manner. The termination connector support bracket generally parallel to and primarily within, the movement plane of the drawer to which it is attached. Each termination connector support bracket includes two or more termination connector support columns, each of which extends vertically in the preferred embodiment of the present invention. Each such termination support column has a first set of connector support arms that extend therefrom in a first direction, as well as a second set of connector support arms that extend generally in the opposite direction. The first and second sets of support arms extend at an offset angle from the movement plane of the drawer; this offset angle ranges between 25 degrees and 65 degrees, and is preferably between 35 degrees and 55 degrees from the movement plane of the drawer. Since the first and second sets of support arms extend in opposite directions, and since they are offset from the drawer movement plane, the first and second sets of connector support arms are disposed on opposite sides of the termination connector support column relative to the drawer movement plane; thus, the first and second sets of support arms extend on opposite sides of the drawer movement plane.

Each drawer is adapted to receive a number of incoming and outgoing optical fibers; the ends of such optical fibers include termination connectors, and the termination connector of one incoming Optical fiber must be coupled with the termination connector of a respective outgoing optical fiber. To this end, a series of incoming fiber optic cable curved guides may be provided on each drawer for partially supporting incoming optical fibers, and for guiding each incoming fiber optic cable to a related coupling adaptor; likewise, a series of outgoing fiber optic cable curved guides may be provided on each drawer for partially supporting outgoing optical fibers, and for guiding each outgoing fiber optic cable to a related coupling adaptors.

A series of such coupling adaptors are secured to, and supported by, the aforementioned connector support arms. Each such adaptor is adapted to receive a termination connector of a selected incoming optical fiber and a termination connector of a selected outgoing optical fiber for removably coupling such optical fibers together.

In the preferred embodiment of the present invention, the termination connector support bracket, including its termination connector support columns and associated connector support arms, are formed of a single piece of material, such as a sheet of metal that is punched and formed to provide such components.

DETAILED DESCRIPTION OF THE PREFERRED EMBODIMENT

Figure 1:
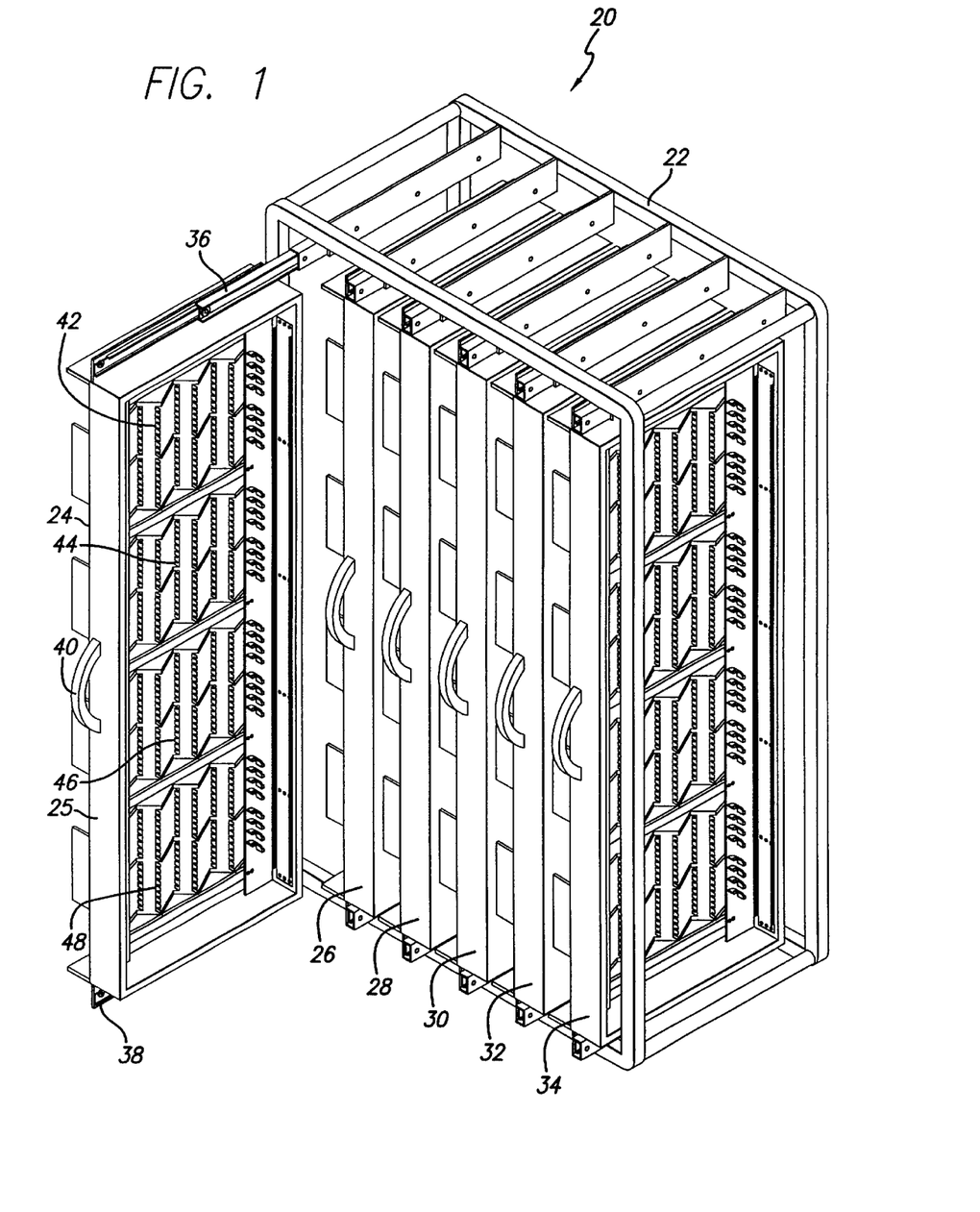
FIG. 1 is a perspective view of a fiber optic cable distribution frame assembly for interconnecting fiber optic cables in accordance with the present invention, and including a support frame and six pull-out drawers.
Figure 2:
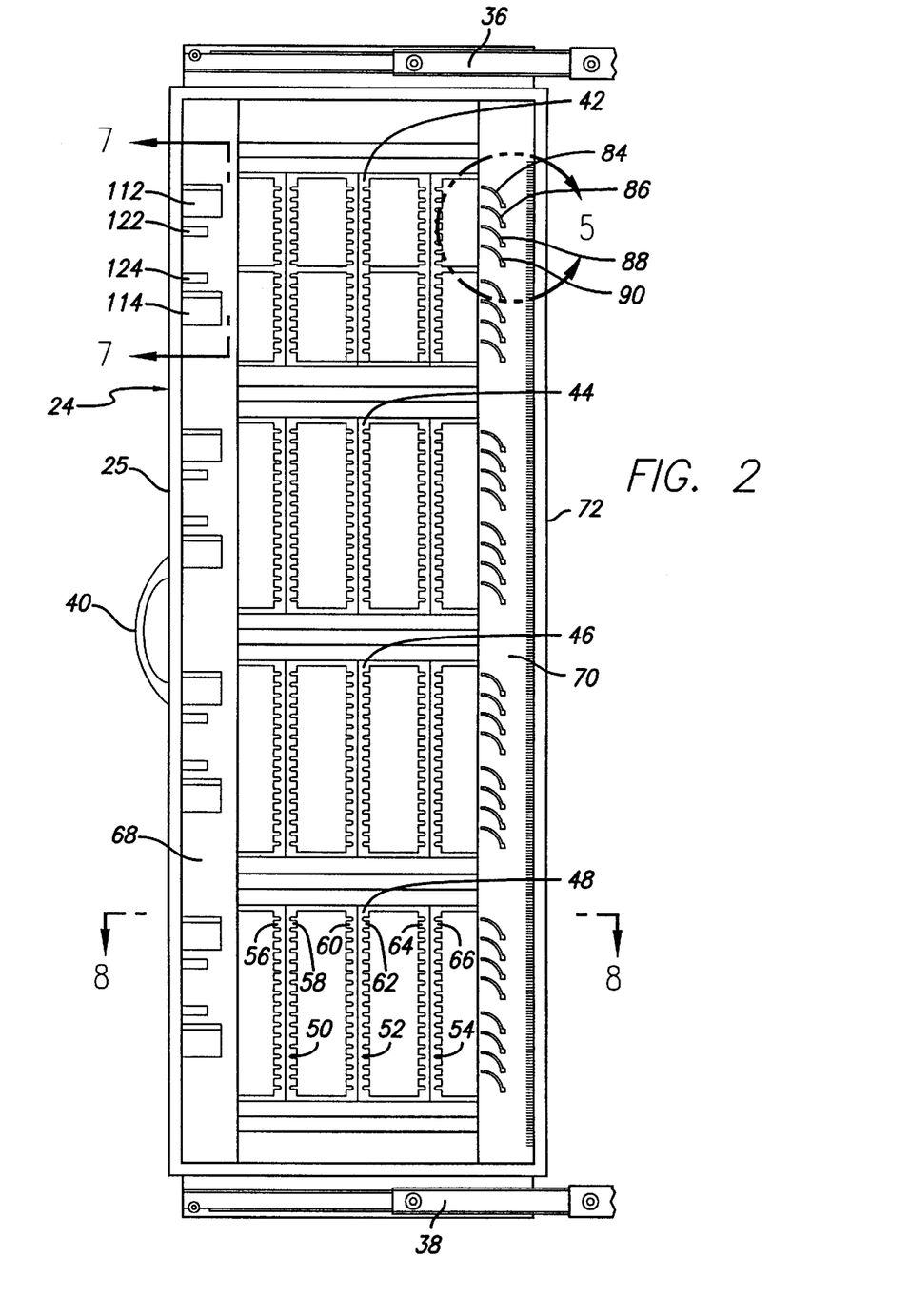
FIG. 2 is a side view of a pull-out drawer shown in FIG. 1 from a first side.

A fiber optic cable distribution frame assembly for interconnecting fiber optic cables in accordance with the present invention is designated generally by reference numeral 20 in FIG. 1. Frame assembly 20 includes a support frame 22 preferably made of metal components. A series of six pull-out drawers 24, 26, 28, 30, 32 and 34 are supported by frame 22. Within FIG. 1, drawer 24 is shown in its extended position projecting from support frame 22, while the remaining pull-out drawers 26, 28, 30, 32 and 34 are shown in their stored position within support frame 22. Each of drawers 24, 26, 28, 30, 32 and 34 are slidingly supported to frame 22 by an upper slide track and a lower slide track. For example, as shown in FIGS. 1 and 2, pull-out drawer 24 is supported by upper slide track 36 and lower slide track 38. These slide tracks allow such drawers to be movable between the stored position and the extended position along a movement plane. These pull-out drawers may also be formed of metal. Each pull-out drawer preferably includes a handle, like handle 40 on pull-out drawer 24, to aid in pulling the drawer from the support frame, and to aid in replacing the drawer back into the support frame.

Figure 3:
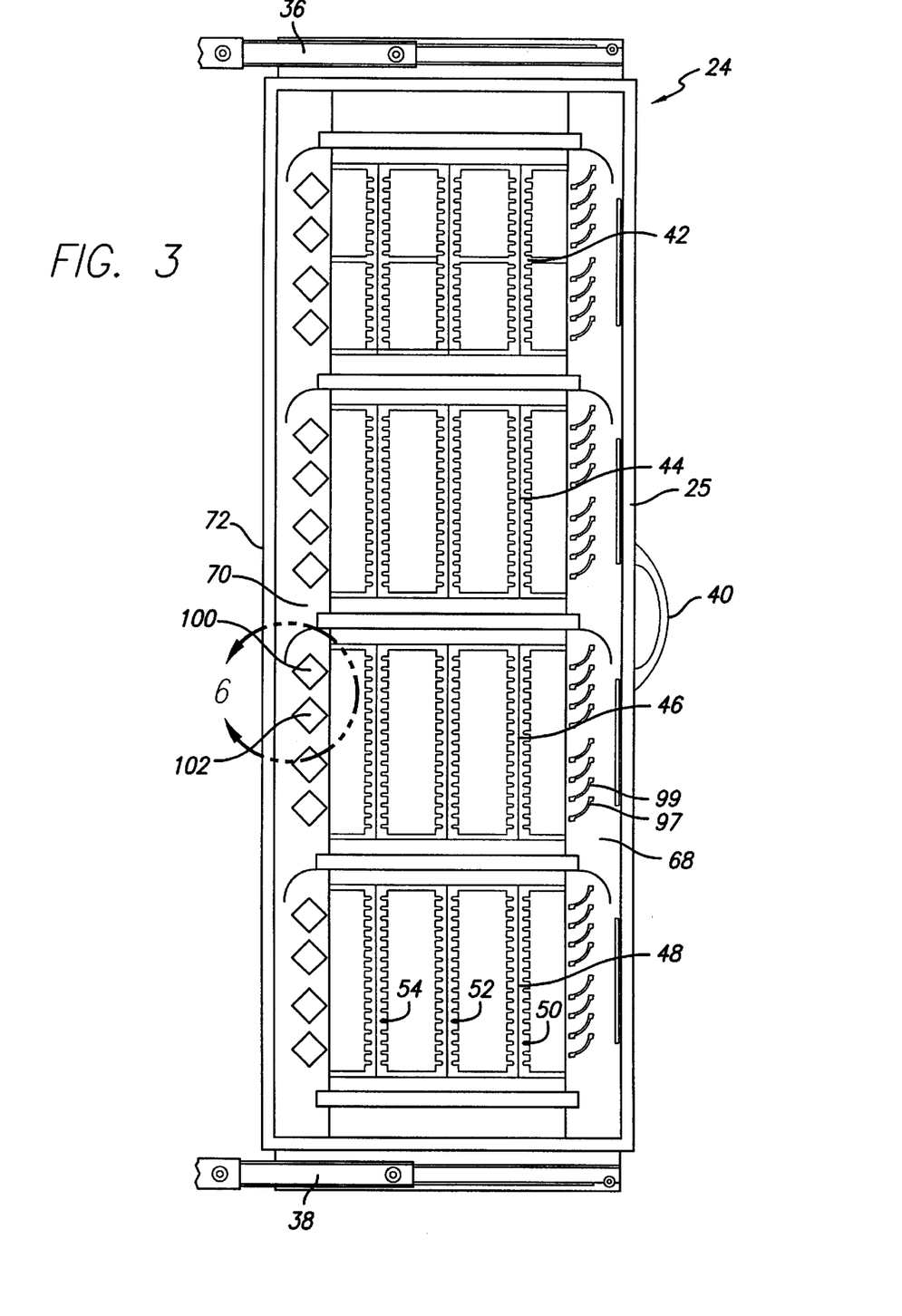
FIG. 3 is a side view of the same pull-out drawer shown in FIG. 2 from the opposite side.
Figure 8:
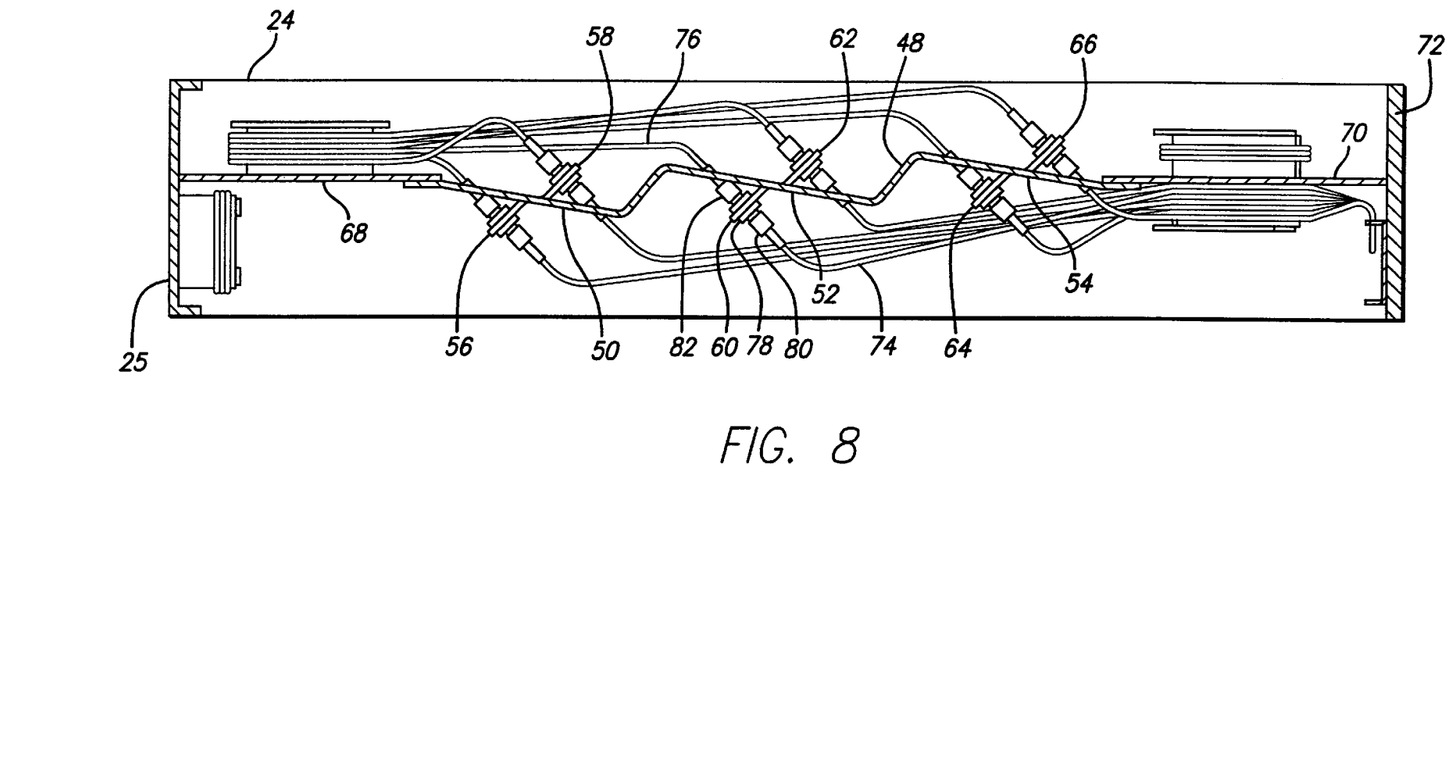
FIG. 8 is a sectional view of the pull-out drawer and termination connector support bracket taken through the plane indicated by lines 8—8 shown in FIG. 2.

Each pull-out drawer supports four termination connector support brackets; as shown in FIGS. 1–3, drawer 24 supports the four termination support brackets identified by reference numerals 42, 44, 46 and 48. Each of such termination support brackets extends generally within the movement plane defined by the sliding motion of drawer 24. Each of the termination support brackets includes three termination connector support columns; for example, as shown in FIGS. 2 and 3, lowermost termination connector support bracket 48 includes support columns 50, 52, and 54. Each of such support columns includes a first set of connector support arms extending therefrom in a first direction and a second set of connector support arms extending therefrom in the opposing direction. Turning to FIG. 8, for example, support column 50 includes support arm 56 extending in a first direction and support arm 58 extending generally in the opposite direction. As is also shown in FIG. 8, support column 52 includes a support arm 60 extending in a first direction and support arm 62 extending in the opposing direction. Likewise, support column 54 includes support arm 64 extending in a first direction and support arm 66 extending in the opposite direction.

As indicated in FIGS. 2 and 3, pull-out drawer 24 includes a vertically-extending panel 68 disposed just behind, and perpendicular to, the front panel 25 of pull-out drawer 24. Likewise, pull-out drawer 24 includes a vertically-extending panel 70 disposed just ahead of, and perpendicular to, the rear panel 72 of drawer 24. Referring again to FIG. 8, panels 68 and 70 define, and lie within, a plane that coincides with the sliding plane of drawer 24. As shown best in FIG. 8, support arms 56 and 58, 60 and 62, and 64 and 66, each extend at an offset angle to the movement plane defined by panels 68 and 70. As shown in FIG. 8, these offset angles are approximately 45 degrees. Preferably, these angles are within the broad range between 25 degrees and 65 degrees, but usually within the narrower range of 35 degrees and 55 degrees. Such angles provide the best compromise of high packing density, narrow drawer width, and avoidance of sharp bend angles on the optical fibers.

Figure 4:
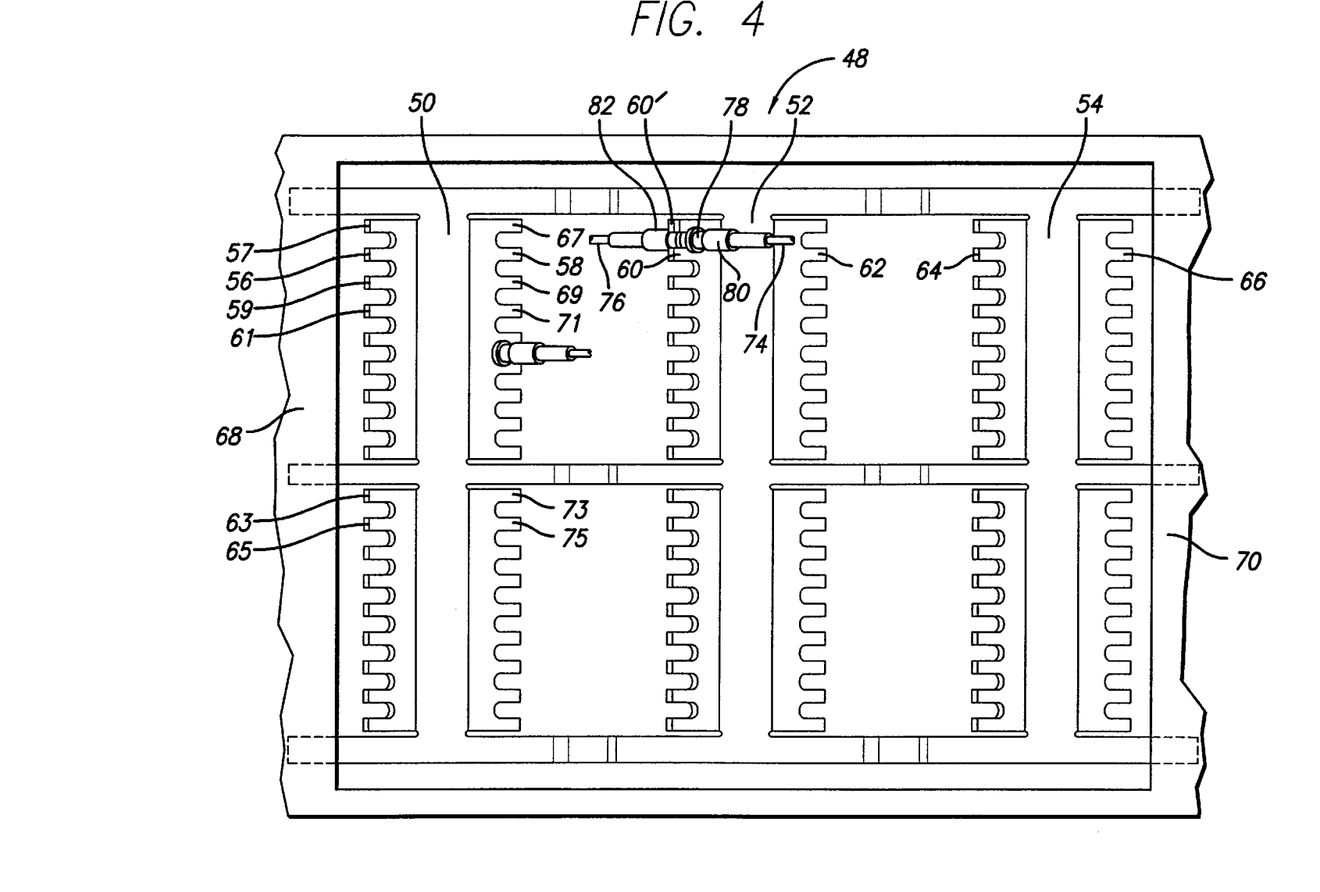
FIG. 4 is an enlarged, partial view of a termination connector support bracket supported by a pull-out drawer.

With regard to FIG. 4, termination connector support bracket 48 is shown in greater detail. Support column 50 includes a first set of support arms that includes those designated by reference numerals 56, 57, 59, 61, 63 and 65, all of which extend at the same angle from support column 50, and all of which extend in the same general direction as each other. The second set of support arms extending from support column 50 includes those designated by reference numerals 58, 67, 69, 71, 73, and 75, all of which extend at the same angle from support column 50, and all of which extend in the same general direction as each other, opposite to the corresponding direction for the aforementioned first set of support arms.

Shown in FIGS. 4 and 8 is an incoming optical fiber 74, an outgoing optical fiber 76, and an adaptor 78 for coupling together the ends of optical fibers 74 and 76 in order to form a continuous light path. The ends of optical fibers 74 and 76 are thin and fragile, and it is accordingly necessary to reinforce such ends before joining them to adaptor 78. Accordingly, the end of optical fiber 74 includes a termination connector 80 designed to interlock with adaptor 78; the combined optical fiber and termination connector is sometimes known in the trade as a patch cord or pig tail. Likewise, the end of optical fiber 76 includes a termination connector 82 also designed to interlock with adaptor 78.

Adaptor 78 is secured to termination connector support bracket 48 by inserting adaptor 78 between two adjacent support arms, such as 60 and 60'. As many as 16 such adaptors can be inserted within the first set of support arms extending from support column 52, and another 16 adaptors can be inserted between the second set of support arms (including support arm 62) which extend from the opposite side of support column 52. Thus each slide drawer has the capacity to hold 32 adaptors times 3 support columns per bracket times 4 brackets per drawer, or 384 adaptors. Accordingly, each pull-out drawer can couple as many as 384 pairs of incoming and outgoing optical fibers.

Figure 5:
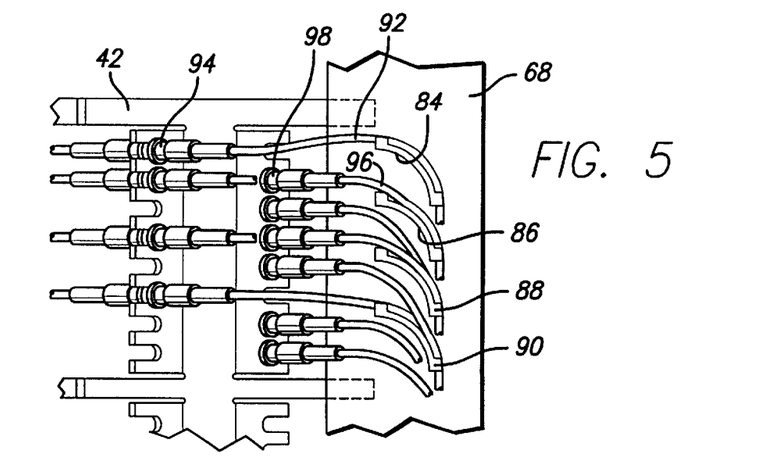
FIG. 5 is an enlarged view of the curved fiber optic cable guides and related termination connectors and adaptors encircled by dashed circle 5 within FIG. 2.

As mentioned above, fiber optic cables should not be sharply bent. Accordingly, pull-out drawer 24 includes curved guides for supporting the incoming and outgoing fiber optic cables within drawer 24. Referring to FIGS. 2 and 5, rear vertical panel 70 includes a series of quarter-turn curved arches, such as those designated by reference numerals 84, 86, 88 and 90 for gently guiding fiber optic cables running up vertically along rear panels 70 and 72 to a horizontal path at approximately the horizontal elevation of the adaptors to which they are to be coupled. For example, guide 84 gently bends outgoing optical fiber 92 toward adaptor 94, while guide 86 gently bends outgoing optical fiber 96 toward adaptor 98. Similar quarter-round guides are provided on forward vertical panel 68 (see FIG. 3), such as 97 and 99 for guiding optical fibers running down front panels 25 and 68 and gently bending such optical fibers into a horizontal path over toward their respective adaptors.

Figure 6:
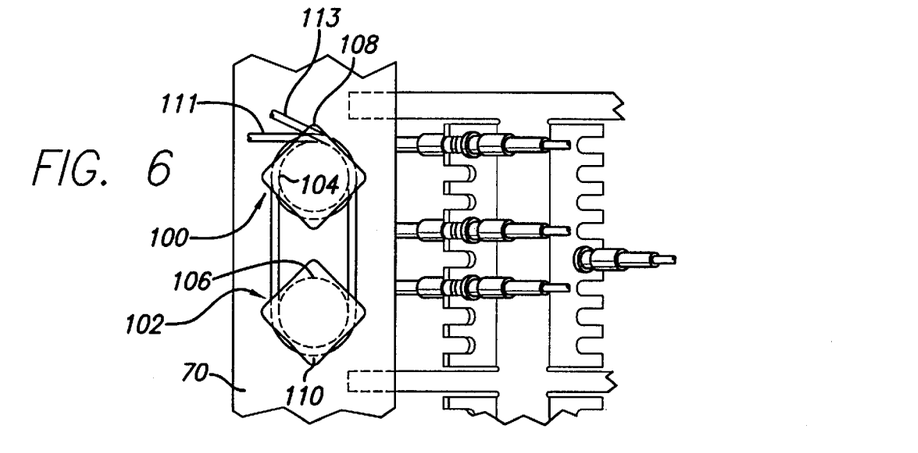
FIG. 6 is an enlarged view of the curved fiber optic cable guides encircled by dashed circle 6 within FIG. 3.

As shown in FIGS. 3 and 6, rear panel 70 may also include guide members 100 and 102 secured thereto for supporting excess lengths of fiber optic cable within drawer 24. Guide member 100 includes a cylindrical surface, shown in dashed outline in FIG. 6 by reference numeral 104, and guide member 102 includes a similar cylindrical surface 106. The excess length of fiber optic cables 111 and 113 are wrapped about guides 102 and 106. Oversized square-shaped caps 108 and 110 cover the outer ends of cylinders 104 and 106, respectively, to ensure that the wrapped portion of cables 111 and 113 do not slide off of the ends of such cylinders.

Figure 7:
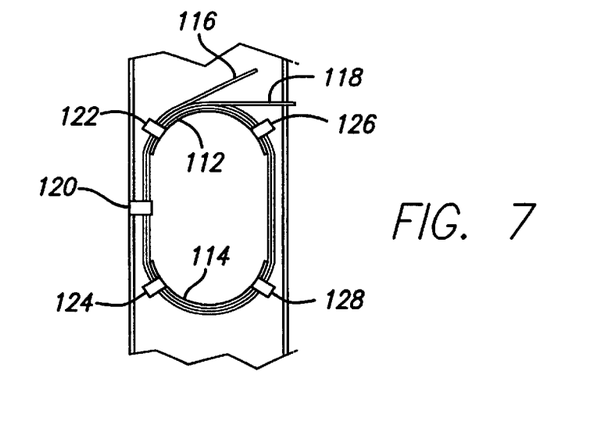
FIG. 7 is a detailed view of an additional curved cable guide housed behind the front panel of the drawer for storing lengths of fiber optic cable, as viewed from the plane designated by arrows 7—7 in FIG. 2..

Referring to FIGS. 2 and 7, pairs of half-round curved guides, such as those designated as 112 and 114, are secured to the rear-facing side of front panel 25, again for supporting excess lengths of fiber optic cable within drawer 24, such as fiber optic cables 116 and 118. Retainer flanges 120-128 prevent fiber optic cables 116 and 118 from sliding off of guides 112 and 114.

As mentioned above, the termination connector support brackets, for example support bracket 48 including the support columns 50, 52, and 54, and support arms such as 56, 57, 58 and 67, can all be made from a single piece of material. For example, a single piece of sheet metal can easily be punched and formed to provide such support brackets.

Those skilled in the art will now appreciate that an improved fiber optic cable distribution frame assembly for interconnecting fiber optic cables has been described which is adapted to removably couple selected pairs of incoming and outgoing fiber optic cables. The frame assembly of the present invention provides a significantly higher density than known in the prior art while making it relatively easy for a technician to locate any particular junction between an incoming and outgoing fiber optic cable. Moreover, such high density is achieved without risking sharp bends to such cables as might compromise the integrity of such cables.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:
1. A fiber optic cable distribution frame assembly for interconnecting fiber optic cables, comprising in combination:
   a. a support frame;
   b. a drawer slidingly supported by said support frame for movement between a stored position disposed within said support frame and an extended position projecting from said support frame, said drawer being movable between the stored position and the extended position along a movement plane;
   c. a termination connector support bracket supported by said drawer, extending generally within said movement plane, and including at least first and second termination connector support columns, each of said first and second termination support columns having a first set of connector support arms extending from said termination connector support column in a first direction and a second set of connector support arms extending from said termination connector support column in a second direction generally opposite to the first direction, each of said first and second sets of connector support arms extending at an offset angle to said movement plane, the offset angle ranging between 25 degrees and 65 degrees ; and
   d. a plurality of incoming fiber optic cables each being partially supported by said drawer and each having a termination connector at one end thereof;
   e. a plurality of outgoing fiber optic cables each being partially supported by said drawer and each having a termination connector at one end thereof;
   f. a plurality of adaptors supported by the connector support arms of said termination connector support bracket, each adaptor receiving a termination connector of a selected incoming fiber optic cable and a termination connector of a selected outgoing fiber optic cable for removably coupling the selected incoming fiber optic cable to the selected outgoing fiber optic cable.

2. The fiber optic cable distribution frame assembly recited by claim 1 wherein said first set of connector support arms and said second set of connector support arms that extend from each termination connector support column are disposed on opposite sides of said termination connector support column relative to said movement plane.

3. The fiber optic cable distribution frame assembly recited by claim 1 wherein said first and second termination connector support columns and said first and second sets of connector support arms extending from each of said termination support columns are formed of a single piece of material.

4. The fiber optic cable distribution frame assembly recited by claim 3 wherein said single piece of material is a metal.

5. The fiber optic cable distribution frame assembly recited by claim 1 wherein said drawer includes incoming cable guides for guiding each incoming fiber optic cable to one of said adaptors, and wherein said drawer includes outgoing cable guides for guiding each outgoing fiber optic cable to one of said adaptors.

6. The fiber optic cable distribution frame assembly recited by claim 1 including a slide track for slidably mounting said drawer to said support frame.

7. A fiber optic cable distribution frame assembly for interconnecting fiber optic cables, comprising in combination:

a. a support frame;

b. a drawer slidingly supported by said support frame for movement between a stored position disposed within said support frame and an extended position projecting from said support frame, said drawer being movable between the stored position and the extended position along a movement plane;

c. a termination connector support bracket supported by said drawer, extending generally within said movement plane, and including at least first and second termination connector support columns, each of said first and second termination support columns having a first set of connector support arms extending from said termination connector support column in a first direction and a second set of connector support arms extending from said termination connector support column in a second direction generally opposite to the first direction, each of said first and second sets of connector support arms extending at an offset angle to said movement plane, the offset angle ranging between 25 degrees and 65 degrees; and d. a plurality of adaptors supported by the connector support arms of said termination connector support bracket, each adaptor being adapted to receive a termination connector of an incoming fiber optic cable, and each adaptor being adapted to receive a termination connector of an outgoing fiber optic cable for removably coupling the incoming fiber optic cable to the outgoing fiber optic cable.

8. The fiber optic cable distribution frame assembly recited by claim 7 wherein said first set of connector support arms and said second set of connector support arms that extend from each termination connector support column are disposed on opposite sides of said termination connector support column relative to said movement plane.

9. The fiber optic cable distribution frame assembly recited by claim 7 wherein said first and second termination connector support columns and said first and second sets of connector support arms extending from each of said termination support columns are formed of a single piece of material.

10. The fiber optic cable distribution frame assembly recited by claim 9 wherein said single piece of material is a metal.

11. The fiber optic cable distribution frame assembly recited by claim 7 wherein said drawer includes incoming cable guides for guiding a plurality of incoming fiber optic cables to one of said adaptors, and wherein said drawer includes outgoing cable guides for guiding a plurality of outgoing fiber optic cables to one of said adaptors.

12. The fiber optic cable distribution frame assembly recited by claim 7 including a slide track for slidably mounting said drawer to said support frame.

* * * * *